US007796105B2

(12) United States Patent
Moon

(10) Patent No.: US 7,796,105 B2
(45) Date of Patent: Sep. 14, 2010

(54) LIQUID CRYSTAL DISPLAY AND DRIVING METHOD THEREOF

(75) Inventor: Seung Hwan Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 738 days.

(21) Appl. No.: 11/685,345

(22) Filed: Mar. 13, 2007

(65) Prior Publication Data

US 2007/0152940 A1 Jul. 5, 2007

Related U.S. Application Data

(63) Continuation of application No. 11/406,728, filed on Apr. 19, 2006, now abandoned, which is a continuation of application No. 10/303,652, filed on Nov. 25, 2002, now Pat. No. 7,209,102.

(30) Foreign Application Priority Data

Nov. 26, 2001 (KR) .......................... 2001-0073913
Mar. 21, 2002 (KR) .......................... 2002-0015364

(51) Int. Cl.
*G09G 3/36* (2006.01)
*G09G 5/10* (2006.01)
*G06F 3/038* (2006.01)

(52) U.S. Cl. .......................... 345/87; 345/204; 345/690

(58) Field of Classification Search ........... 345/87–100, 345/204–214, 690–697
See application file for complete search history.

(56) References Cited

U.S. PATENT DOCUMENTS 5,774,099 A * 6/1998 Iwasaki ....................... 345/87
6,169,532 B1 * 1/2001 Sumi ........................... 345/98
6,229,510 B1 * 5/2001 Kim et al. ...................... 345/87
6,356,523 B1 * 3/2002 Hasebe .................... 369/47.45
6,392,626 B1 * 5/2002 Moon .......................... 345/94
6,603,456 B1 * 8/2003 Aoki .......................... 345/100
6,677,925 B1 * 1/2004 Kawaguchi .................. 345/98
2003/0126474 A1 * 7/2003 Sawyers et al. ............. 713/300

FOREIGN PATENT DOCUMENTS

JP 63175890 7/1988
JP 05066386 3/1993
JP 2001318391 11/2001

* cited by examiner

*Primary Examiner*—Bipin Shalwala
*Assistant Examiner*—Sosina Abebe
(74) *Attorney, Agent, or Firm*—Cantor Colburn LLP

(57) ABSTRACT

A liquid crystal display and method for driving the liquid crystal display are provided. The liquid crystal display includes a liquid crystal panel assembly including a plurality of gate lines, a plurality of data lines intersecting the gate lines, a plurality of switching elements connected to the gate lines and the data lines, a plurality of pixel electrodes connected to the switching elements, and a reference electrode opposing the pixel electrodes, a gate driver for applying gate signals to the gate lines to activate the switching elements, a data driver for applying data voltages that are be applied to the pixel electrodes to the data lines, and a reference voltage generator for generating first to third reference voltages to be respectively applied to first to third positions of the reference electrode, the first reference voltage being smaller than the third reference voltage and the third reference voltage being smaller than the second reference voltage, and the first position being closer to the gate driver than the third position and the third position being closer to the gate driver than the second position.

8 Claims, 7 Drawing Sheets

LIQUID CRYSTAL DISPLAY AND DRIVING METHOD THEREOF

CROSS REFERENCE TO RELATED APPLICATIONS

This application is a continuation application of U.S. application Ser. No. 11/406,728 filed Apr. 19, 2006, which is a continuation application of U.S. application Ser. No. 10/303,652 filed Nov. 25, 2002 which claims priority to and the benefit of Korean Patent Application No. 2001-0073913 filed on Nov. 26, 2001 and Korean Patent Application No. 2002-0015364 filed on Mar. 21, 2002, all of which are incorporated by reference herein in their entirety.

BACKGROUND OF THE INVENTION

1. Field of the Invention

The present invention relates to a liquid crystal display and a driving method thereof.

2. Description of Related Art

Liquid crystal displays ("LCDs") are widely used as flat panel displays and include two panels provided with two kinds of field-generating electrodes (e.g., a plurality of pixel electrodes and one large planar reference electrode) on their inner surfaces and a liquid crystal layer interposed between the panels. A difference between the voltages applied to the field-generating electrodes generates an electric field in the liquid crystal layer and the orientations of liquid crystal molecules in the liquid crystal layer change depending on the intensity of the electric field. The changing of the orientations of the liquid crystal molecules alters the polarization of the light passing through the liquid crystal layer, which results in the variation of light transmittance by polarizers attached on outer surfaces of the panels. Therefore, the light transmittance can be controlled by adjusting the voltage difference between the field-generating electrodes to change the intensity of the electric field.

LCDs include a plurality of pixels arranged in a matrix and a plurality of display signal lines for transferring signals to the pixels. Each pixel includes a liquid crystal capacitor and a switching element connected to the liquid crystal capacitor and the display signal lines. The liquid crystal capacitor includes two terminals and a liquid crystal dielectric between the two terminals. The two terminals of the liquid crystal capacitor are formed by the pixel electrode and a portion of the reference electrode opposite the pixel electrode. An example of the switching element is a thin film transistor ("TFT") having a control terminal and input and output terminals.

The display signal lines include a plurality of gate lines transmitting gate signals for turning on/off the switching elements and a plurality of data lines transmitting data signals to be applied to the pixel electrodes of the liquid crystal capacitors. In detail, each switching element is connected to one of the gate lines and one of the data lines such that the switching element is turned on upon receipt of a gate-on voltage of the gate signal to transfer the data signals from the data line to the liquid crystal capacitor and the switching element is turned off upon receipt of a gate-off voltage of the gate signal not to transfer the data signals. The reference electrode receives a predetermined voltage called a "reference voltage."

The direction of the electric field is repeatedly reversed to prevent the electric and physical characteristics of the liquid crystal layer from deteriorating due to the long-term application of a unidirectional field. To reverse the direction of the electric field, the polarity of the data voltages applied to the pixel electrode with respect to the reference voltage applied to the reference electrode is periodically reversed.

However, such polarity inversion brings an undesirable phenomenon called "flicker" that is a blinking of an image-displaying screen. The flicker is resulted from the reduction of the voltage of the reference electrode due to a kickback voltage originated from the switching characteristics of the switching element. The voltage drop of the reference electrode due to the kickback voltage is proportional to a magnitude of the kickback voltage.

The magnitude of the kickback voltage depends upon the position of the kickback voltage on the panels, which shows drastic position dependency especially in a row direction, i.e., an extension direction of the gate lines. A difference between the gate-on voltage and the gate-off voltage, which determines the magnitude of the kickback voltage, varies along the gate lines due to the delay of the gate signal. In detail, the kickback voltage has the largest value at the position at which the gate signal is applied, and it becomes smaller as it goes along the gate line because the signal delay of the gate signal becomes larger.

One of the techniques for solving this problem is to apply a plurality of reference voltages with different magnitudes to at least two points on the reference electrode.

For example, the magnitude difference of the kickback voltage along the gate line is compensated by applying different reference voltages to two points of the reference electrode, e.g., two opposite ends of the reference electrode in the row direction.

The technique assumes that the voltage drop of the kickback voltage shows linearity due to the delay of the gate signal. However, since the actual, kickback voltage shows non-linearity, the technique is not effective.

Moreover, conventional techniques generally use a variable resistor for adjusting the reference voltages applied to the reference electrode. The adjustment of the resistance of the variable resistor may affect a potential difference between the two opposite end points of the reference electrode, thereby making the flicker tuning difficult.

SUMMARY OF THE INVENTION

The present invention solves the problems of a conventional liquid crystal display.

According to an aspect of the invention, a liquid crystal display comprises a liquid crystal panel assembly including a plurality of gate lines, a plurality of data lines intersecting the gate lines, a plurality of switching elements connected to the gate lines and the data lines, a plurality of pixel electrodes connected to the switching elements, and a reference electrode opposing the pixel electrodes; a gate driver for applying gate signals to the gate lines to activate the switching elements; a data driver applying data voltages that are applied to the pixel electrodes to the data lines; and a reference voltage generator for generating first to third reference voltages to be respectively applied to first to third positions of the reference electrode, wherein the first reference voltage is smaller than the third reference voltage, the third reference voltage is smaller than the second reference voltage, the first position is closer to the gate driver than the third position, and the third position is closer to the gate driver than the second position.

It is preferable that a value of the third reference voltage is identical to an average value of the first reference voltage and the second reference voltage.

According to an embodiment of the present invention, the reference voltage generator comprises a first group of resistors for dividing an external voltage; a transistor activated by a first divided voltage outputted from the first group of resistors; a first capacitor for storing an output voltage of the transistor and providing the stored voltage as the second reference voltage; a group of diodes for dropping the output voltage of the transistor; a second group of resistors for dividing a voltage across the group of diodes; and an amplifier for amplifying a second divided voltage outputted from the second group of resistors and outputting an amplified voltage as the first reference voltage, the amplifier including an inverting terminal connected to the third position.

According to another embodiment of the present invention, the reference voltage generator comprises a first amplifier including a noninverting terminal for receiving a first voltage, an inverting input terminal connected to the third position of the reference electrode to provide the third reference voltage, and an output terminal, the first amplifier amplifying the first voltage and outputting the amplified first voltage as the first reference voltage via the output terminal; and a second amplifier including a noninverting terminal for receiving a second voltage, an inverting input terminal and an output terminal, the second amplifier amplifying the second voltage and outputting the amplified second voltage as the second reference voltage.

According to still another embodiment of the present invention, the output of the first amplifier is connected to the inverting input terminal of the second amplifier. The reference voltage generator preferably further comprises a second capacitor, connected between the output terminal of the first amplifier and the inverting input terminal of the second amplifier, for storing and outputting an output voltage of the first amplifier to the inverting input terminal of the second amplifier; and a fifth resistor connected to the noninverting input terminal of the second amplifier. A time constant of the fifth resistor and the second capacitor is identical to or greater than about 1 hour (H) period.

The reference voltage generator still further comprises a sixth resistor connected to the inverting input terminal of the second amplifier; and a seventh resistor connected between the inverting input terminal of the second amplifier and the output terminal of the second amplifier.

According to another aspect of the invention, a method of driving a liquid crystal display comprises applying data voltages to pixel electrodes via switching elements connected to the pixel electrodes, the switching elements being activated by a gate driver; and applying first to third reference voltages to first to third positions of a reference electrode opposing the pixel electrodes, wherein the first reference voltage is smaller than the third reference voltage, the third reference voltage is smaller than the second reference voltage, the first position is closer to the gate driver than the third position, and the third position is closer to the gate driver than the second position.

It is preferable that a value of the third reference voltage is identical to an average value of the first reference voltage and the second reference voltage.

According to further aspect of the invention, a liquid crystal display, comprises a liquid crystal panel assembly comprising a plurality of pixel electrodes and a reference electrode opposing the pixel electrodes, a gate driver for driving a plurality of gate lines to activate a plurality of switching elements connected to the pixel electrodes, a data driver for driving a plurality of data lines to apply data voltages to the pixel electrodes, and a reference voltage generator for generating a plurality of reference voltages, the reference voltages being applied to different positions of the reference electrode, values of the reference voltages being increased as the distance between where the reference voltages are applied and where a gate signal is applied increases.

BRIEF DESCRIPTION OF THE DRAWINGS

The above and other objects and advantages of the present invention will become more apparent by describing preferred embodiments thereof in detail with reference to the accompanying drawings in which.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Then, liquid crystal displays and driving methods thereof according to embodiments of the present invention will be described with reference to the drawings.

Figure 1:
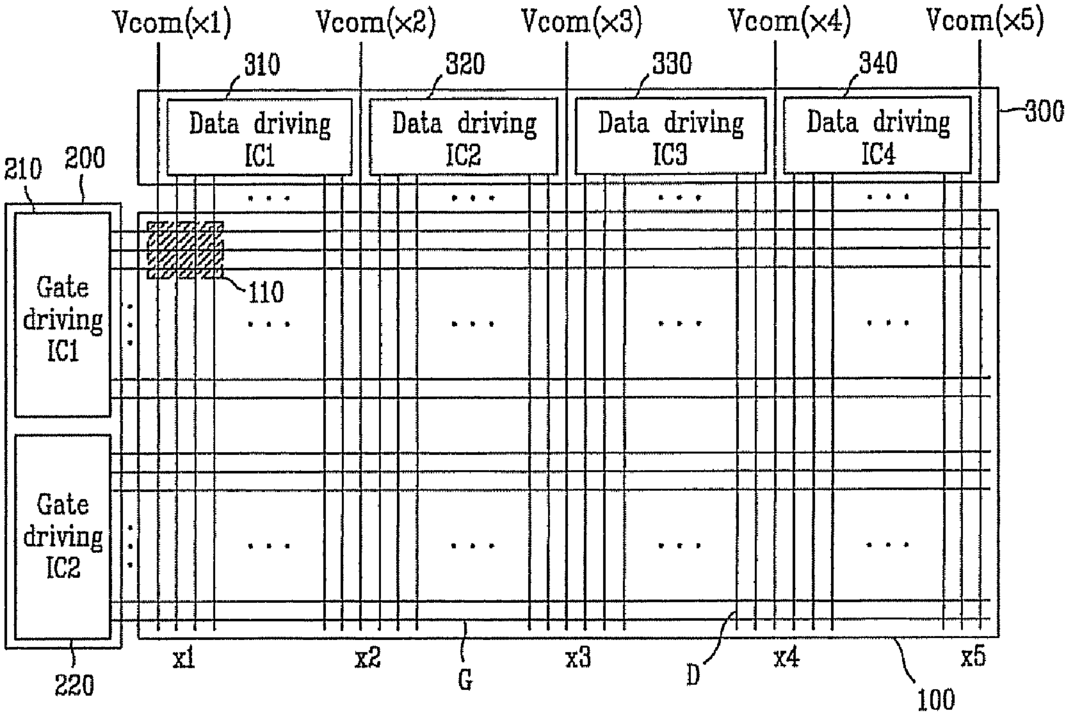
FIG. 1 is a schematic diagram of an LCD according to an embodiment of the present invention.
Figure 2:
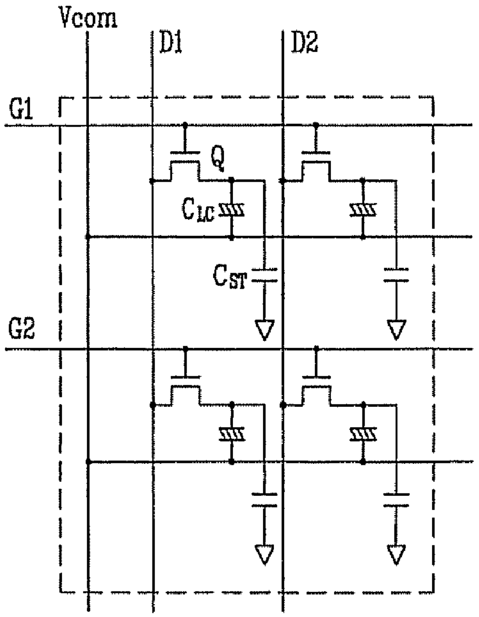
FIG. 2 is an equivalent circuit diagram of pixels of an LCD according to an embodiment of the present invention.

FIG. 1 is a schematic diagram of an LCD according to an embodiment of the present invention, and FIG. 2 is an equivalent circuit diagram of a portion 110 of the LCD shown in FIG. 1. Referring to FIG. 1, an LCD according to an embodiment of the present invention includes a liquid crystal panel assembly 100, a gate driver 200, and a data driver 300.

As shown in FIGS. 1 and 2, the liquid crystal panel assembly 100 includes a plurality of gate lines G and data lines D insulated from each other, each of the gate lines and the data lines extending in transverse and longitudinal directions. The panel assembly 100 also includes a plurality of pixels connected to the gate lines G and the data lines D and arranged in a matrix. Each pixel includes a switching element Q such as a TFT, a liquid crystal capacitor $C_{LC}$, and a storage capacitor $C_{ST}$. The switching element Q has a control terminal connected to one of the gate lines G, an input terminal connected to one of the data lines D, and an output terminal connected to the liquid crystal capacitor $C_{LC}$ and the storage capacitor $C_{ST}$. The liquid crystal capacitor $C_{LC}$ and the storage capacitor $C_{ST}$ are connected between the switching element Q and a reference voltage Vcom.

According to an embodiment of the present invention, the liquid crystal panel assembly 100 includes a first panel (not shown) provided with a plurality of pixel electrodes (not shown), a second panel (not shown) provided with a reference electrode (not shown) and a liquid crystal layer (not shown) interposed therebetween.

In a structural view of the liquid crystal capacitor $C_{LC}$, a pixel electrode and a reference electrode are first and second terminals, and the liquid crystal layer therebetween is a dielectric material in the liquid crystal capacitor $C_{LC}$. One or more pixel electrodes are assigned to each pixel, and, since the reference electrode occupies an entire area of the panel, all the pixels commonly use the reference electrode as the second terminal.

However, an exemplary embodiment of the present invention may be applied to an LCD where both the reference electrode and the pixel electrodes are provided on the same panel. In this case, the reference electrode and the pixel electrodes may have a bar shape or a stripe shape.

As shown in FIG. 1, the gate driver 200 includes a plurality of gate driving integrated circuits ("ICs"), e.g., two ICs 210 and 220 connected to one ends of the gate lines G. Each of the gate driving ICs 210 and 220 includes a shift register (not shown), a level shifter (not shown), and a buffer (not shown), etc. The data driver 300 includes a plurality of data driving ICs, e.g., four ICs 310 to 340 connected to one ends of the data lines D.

According to an embodiment of the present invention, a plurality of reference voltages with different values are applied to a plurality of positions on the reference electrode of the liquid crystal panel assembly 100. The application positions of the reference voltages are spaced apart especially in the transverse direction of the data lines. FIG. 1 shows five application positions (x1 to x5), which are located from a left end to a right end of the panel assembly 100 and each of the application positions is located between the data driving ICs 310 to 340.

The values of the applied reference voltages become larger or the same as it goes farther from the gate driver 200 or from a point at which the gate signal is applied. In the LCD shown in FIG. 1, the relation between the reference voltages is as follows:

$$Vcom(x1)<Vcom(x2)<Vcom(x3)<Vcom(x4)<Vcom(x5).$$

If the gate driver 200 is positioned on the right side of the liquid crystal panel assembly 100, the relationship becomes:

$$Vcom(x5)<Vcom(x4)<Vcom(x3)<Vcom(x2)<Vcom(x1).$$

Figure 3:
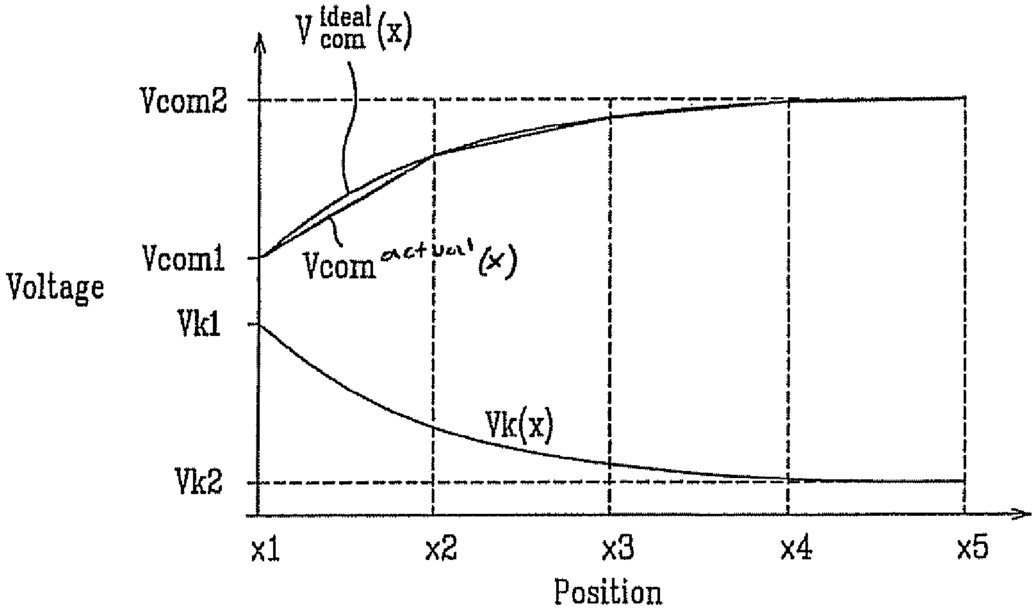
FIG. 3 shows a graph illustrating a relationship of a kickback voltage, an ideal voltage of a reference electrode for compensating a position-dependent variation of the kickback voltage, and an actual voltage of the reference electrode, when reference voltages with different magnitudes are applied to five points on a liquid crystal panel assembly, according to an embodiment of the present invention.

FIG. 3 shows a kickback voltage Vk(x), an ideal voltage $$V_{com}^{ideal}(x)$$

of a reference electrode on a liquid crystal panel assembly for compensating the position-dependent variation of the kickback voltage, and an actual voltage $$V_{com}^{actual}(x)$$

of the reference electrode on a liquid crystal panel assembly according to an embodiment of the present invention.

As shown in FIG. 3, a kickback voltage Vk(x) of an LCD exponentially (or logarithmically) decreases from X(1) to X(5), due to resistances of the gate lines G and a RC time constant caused by a parasitic capacitance. The voltage of the reference electrode on the panel assembly 100 exponentially (or logarithmically) increase from X(1) to X(5) to compensate for the variation of the kickback voltage Vk(x). The values Vcom1 and Vcom2 are determined by the values Vk1 and Vk2.

According to an embodiment of the invention, the actual voltage of the reference electrode at a finite point is adjusted to be equal to the ideal voltage at the point. Then, the actual voltages of the reference electrode between the application points linearly decrease or increase and thus the actual voltages of the reference electrode are slightly different from the ideal voltages of the reference electrode. The actual voltages become closer to the ideal voltages as the number of the application points is increased. The number of the application points may be equal to or smaller than the number of the data driver ICs plus one.

Figure 4:
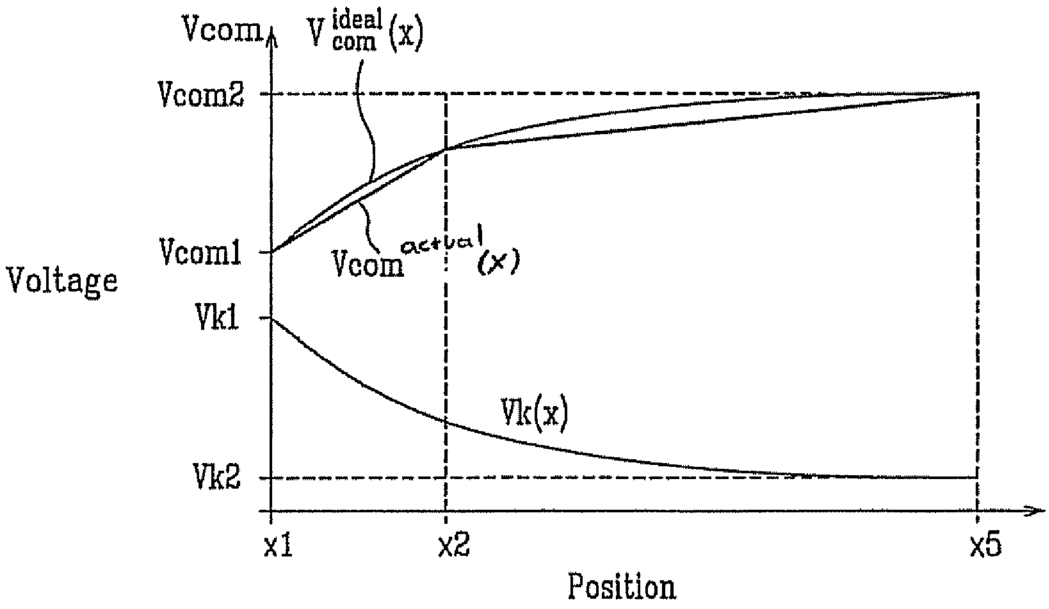
FIG. 4 shows a graph illustrating a relationship of a kickback voltage, an ideal voltage of a reference electrode, and an actual voltage of the reference electrode, when reference voltages with different magnitudes are applied to three points on a liquid crystal panel assembly, according to an embodiment of the present invention.

According to an exemplary embodiment of the invention, three positions on the panel assembly 100 are applied with different reference voltages. FIG. 4 shows a kickback voltage Vk(x), an ideal voltage $$V_{com}^{ideal}(x)$$

of a reference electrode, and an actual voltage $$V_{com}^{actual}(x)$$

of the reference electrode when different reference voltages are applied to three points of the panel assembly 100.

Since the kickback voltage Vk(x) and the ideal voltage $$V_{com}^{ideal}(x)$$

associated therewith increase logarithmically as shown in FIGS. 3 and 4, the variation of the ideal voltage $$V_{com}^{ideal}(x)$$

of the reference electrode to the kickback voltage Vk(x) becomes larger as it goes closer to a point where a gate signal is applied on the panel assembly 100 (referred to as a "gate-start point" hereinafter). For instance, as shown in FIG. 4, when a gate signal is applied to a point (x1), three-point application of the reference voltages are a gate-start point (x1), a gate finish point (x5) that is an end point of a gate line, and a point (x2) nearest to the gate-start point (x1) among the above-described five positions shown in FIG. 1. According to an embodiment of the present invention, two different reference voltages Vcom1 and Vcom2 are respectively applied to the gate-start point (x1) and the gate-finish point (x5), and another reference voltage having a value of (Vcom1+Vcom2)/2, which is determined for simple configuration of relevant circuits, is applied to a predetermined point, for example, the point (x2), between the gate-start point (x1) and the gate-finish point (x5).

Figure 5:
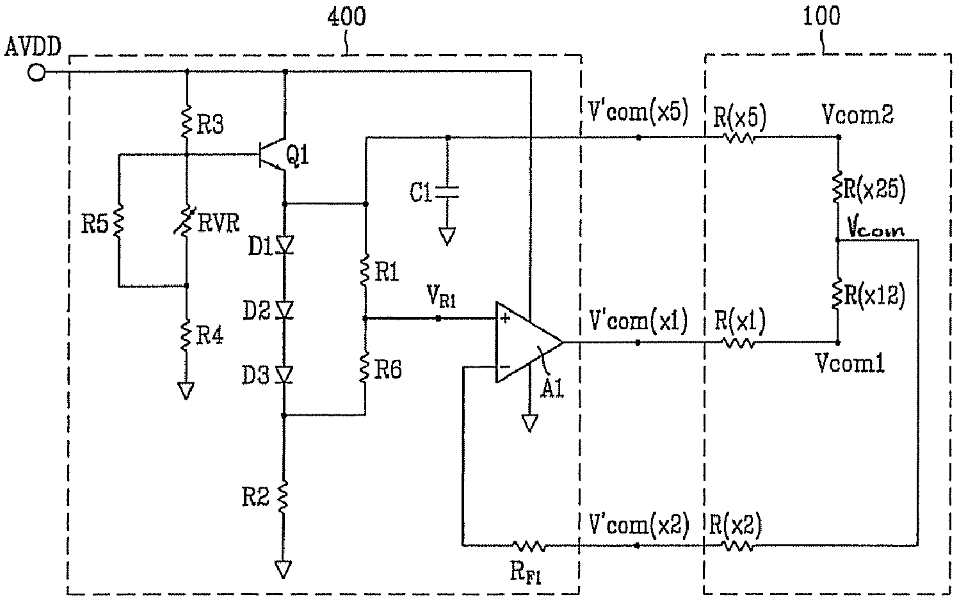
FIG. 5 is a circuit diagram of an exemplary reference voltage generation circuit according to an embodiment of the present.

FIG. 5 shows a reference voltage generation circuit 400 of an LCD for generating a plurality of reference voltages, according to an embodiment of the present invention. In FIG. 5, the liquid crystal panel assembly 100 is represented as an equivalent circuit associated with the voltage of a reference electrode.

As shown in FIG. 5, a reference voltage generation circuit 400 according to an embodiment of the present invention includes a first group of resistors including a third resistor R3, a variable resistor RVR and a fourth resistor R4 that are serially connected to an external voltage AVDD, a transistor Q1 having a base connected to a node between the variable resistor RVR and the third resistor R3 and a collector connected to the external voltage AVDD, a group of diodes D1, D2 and D3 connected in serial to an emitter of the transistor Q1, a second resistor R2 serially connected between a cathode of the diode D3 and a ground, a second group of resistors including first and sixth resistors R1 and R6 connected in serial across the diodes D1 to D3, an amplifier Al having a noninverting input terminal (+) connected to a node between the first and sixth resistors R1 and R6, an inverting input terminal (−) and an output terminal, a seventh resistor Rf1 connected to the inverting input terminal (−) of the amplifier A1, and a capacitor C1 connected to the first resistor R1. A fifth resistor R5 is connected to the node between the third resistor R3 and the variable resistor RVR and a node between the variable resistor RVR and the fourth resistor R4.

The liquid crystal panel assembly 100 comprises first to third internal resistors R(x1), R(x2) and R(x5) that are resistance paths from the reference voltage generation circuit 400 to three application points (x1, x2 and x5), respectively, and fifth and fourth resistors R(x25) and R(x12) that are the resistances of the reference electrode between the application points (x2 and x5) and between (x1 and x2), respectively.

The output terminal of the amplifier A1, one terminal of the resistance Rf1, and one terminal of the capacitor C1 are electrically connected to the application points (x1, x2 and x3) on the panel assembly 100 via the first to third internal resistors R(x1), R(x2) and R(x5).

The voltages Vcom1 and Vcom2 represent the voltages applied to the application points (x1 and x5), respectively, and are equal to the values of output voltages V'com(x1) and V'com(x5) of the reference voltage generation circuit 400 after voltage-dropped by the resistors R(x1) and R(x5), respectively. Assume that the resistances of the first and third internal resistors R(x1) and R(x5) are negligible, the output voltages V'com(x1) and V'com(x5) are the same as the voltages Vcom1 and Vcom2, respectively. Accordingly, V'com (x1) and Vcom1; and V'com(x5) and Vcom2 are not considered to be distinct and are referred to as “reference voltages” hereinafter unless it is necessary to distinguish them. Likewise, V'com(x2) is also an output voltage of the reference voltage generation circuit 400, and Vcom is the voltage applied to the application point (x2).

The resistances in the reference voltage generation circuit 400 are adjusted such that the reference voltage V'com(x2) has a value substantially equal to (V'com(x1)+V'com(x5))/2.

The operation of the reference voltage generation circuit 400 having above-described configuration according to an embodiment of the present invention is now described in detail.

An external voltage AVDD is voltage-divided by the first group of resistors R3, RVR and R4, and the transistor Q1 turns on when the divided voltage at the node between the resistor R3 and the variable resistor RVR becomes equal to or larger than a threshold voltage of the transistor Q1. Upon turning on of the transistor Q1, the group of diodes D1-D3 and the second group of resistors R1 and R6 are biased with the divided voltage, and the capacitor C1 is charged.

The potential difference across the group of diodes D1, D2 and D3 is divided by the second group of resistors R1 and R6 and inputted to the noninverting input terminal (+) of the amplifier A1. The amplifier A1 amplifies the voltage inputted at the noninverting input terminal (+) and provides the amplified voltage as the reference voltage V'com(x1) for the gate-start point (x1) of the liquid crystal panel assembly 100. On the other hand, the voltage across the capacitor C1 is outputted as the reference voltage V'com(x5) and inputted to the gate-finish point (x5) of the liquid crystal panel assembly 100.

As described above, the reference voltages V'com(x1) and V'com(x5) generated from the reference voltage generation circuit 400 are voltage-dropped by the first and third internal resistors R(x1) and R(x5) and applied to the corresponding points (x1 and x5) of the liquid crystal panel assembly 100. In this way, first and second voltages Vcom1 and Vcom2 are applied to the gate-start point (x1) and the gate-finish point (x5) of the reference electrode of the panel assembly 100.

The voltage difference between the first and the second voltages Vcom1 and Vcom2 is divided by the fourth internal resistor R(x12) between the application points (x1 and x2) and the fifth internal resistor R(x25) between the application points (x2 and x5) of the panel assembly 100, and the divided voltage is inputted to the inverting input terminal (−) of the amplifier A1, and then, the voltage Vcom which equals to (Vcom1+Vcom2)/2 can be applied to the point (x2) of the reference electrode.

Here, the potential difference of Vcom2−(Vcom1+Vcom2)/2 is determined by a resistance ratio of the first and sixth resistors R1 to R6. The first and the second voltages Vcom1 and Vcom2 may be changed by adjusting the resistance of the variable resistor RVR.

Figure 6:
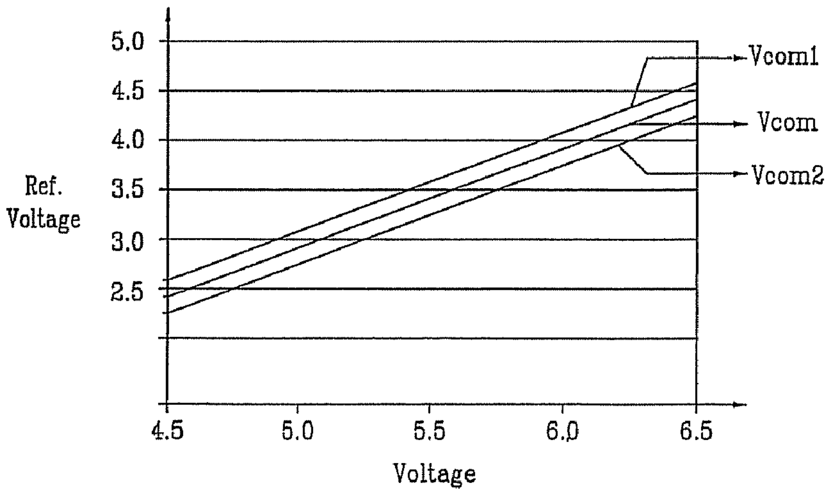
FIG. 6 is a graph showing the voltages of a reference electrode with respect to a resistance of a variable resistor of the reference voltage generator shown in FIG. 5.

FIG. 6 shows the voltages Vcom1, Vcom2 and Vcom of a reference electrode at the points (x1, x2 and x5) with respect to the resistance of the variable resistor RVR shown in FIG. 5. In FIG. 6, a X-axis indicates the base voltage of the transistor Q1, and a Y-axis indicates the voltage applied to the reference electrode.

The voltages Vcom1, Vcom and Vcom2 applied to the points (x1, x2, and x5) of the liquid crystal panel assembly 100 increase as the output voltages of the capacitor C1 and the amplifier A1 increase proportional to the base voltage of the transistor Q1, which is increased by varying the resistance of the variable resistor RVR. In addition, the voltage difference (Vcom2-Vcom1) between the first and the second voltages Vcom1 and Vcom2 is maintained at a constant value, irrelevant to the change of the base voltage of the transistor Q1.

According to the invention, it is possible to generate a voltage Vcom, at a predetermined position of the reference electrode on the panel assembly 100, having an average value of the voltages at the opposite ends of the panel assembly 100, and to maintain a potential difference between the reference voltages Vcom2 and Vcom1 at the two ends of the panel assembly 100 at a constant value by adjusting the average voltage Vcom.

Resistances between any two points (for example, x1 and x5) on the panel assembly 100 are substantially the same, assumed that the size of the reference electrode is very large and thus a sheet resistance is the same at any point on the reference electrode. Therefore, it is possible to apply an average voltage value (Vcom1+Vcom2)/2 to any point (e.g., x2, x3 and x4) of the liquid crystal panel assembly 100, shown in FIG. 2.

According to an embodiment of the present invention, since the voltage distribution on the reference electrode is closer to the ideal voltage distribution in the view of the flicker than the conventional voltage distribution showing the linear voltage variation along a gate line, the flicker characteristic may be improved.

In addition, the voltage difference between the opposite ends of the reference electrode may be maintained, and a time for adjusting a voltage may be reduced by using a variable resistor. As a result, the productivity and display characteristic of the LCD are improved.

Figure 7:
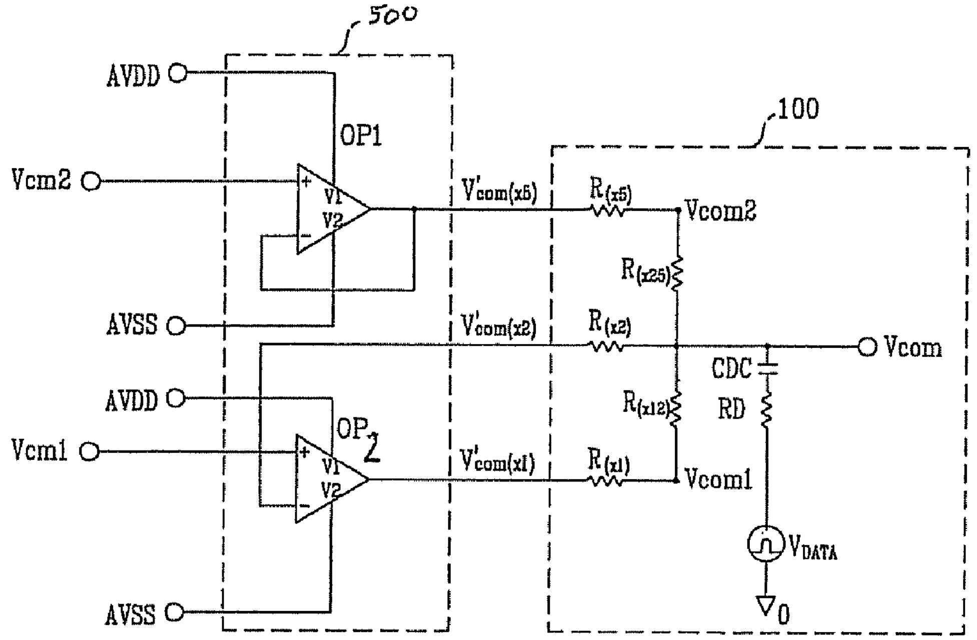
FIG. 7 is a circuit diagram of an exemplary reference voltage generation circuit according to another embodiment of the present invention.

FIG. 7 shows a reference voltage generation circuit according to another embodiment of the present invention.

As shown in FIG. 7, a reference voltage generation circuit 500 according to this embodiment of the present invention includes a first amplifier OP1 and a second amplifier OP2 that are biased with external voltages AVDD and AVSS and have noninverting input terminals (+) for receiving external voltages Vcm1 and Vcm2, respectively. A liquid crystal panel assembly 100 is shown as an equivalent circuit relevant to the reference voltages like the described embodiment in FIG. 5 but further including a parasitic capacitor CDC and a resistor RD representing the resistance on a data line.

Referring to FIG. 7, the output voltages of the first and the second amplifiers OP1 and OP2 are respectively applied to the gate-start point (x1) and the gate-finish point (x5) on the liquid crystal panel assembly 100. The output of the second amplifier OP2 is connected to the inverting input terminal (−) thereof to provide negative feedback, and the voltage Vcom of the point (x2) on the reference electrode, which is equal to (Vcom1+Vcom2)/2, is returned to an inverting input terminal (−) of the first amplifier OP1.

According to this embodiment, the first and the second amplifiers OP1 and OP2 amplify the external voltages Vcm1 and Vcm2 to supply the first and the second voltages Vcom1 and Vcom2 to the application points (x1 and x5) of the panel assembly 100 through on-path resistors R(x1) and R(x5). The voltage difference between the first and the second voltages Vcom1 and Vcom2 is divided by the internal resistors R(x12) and R(x25) between the application points (x1 and x2) and between the points (x2 and x5) and the divided voltage is returned to the inverting input terminal (−) of the first amplifier OP1, and simultaneously, the average voltage (Vcom1+Vcom2)/2 is applied to an arbitrary point (x2) of the panel assembly 100.

According to this embodiment of the present invention, the first voltage Vcom1, the second voltage Vcom2 and the average voltage Vcom corresponding to (Vcom1+Vcom2)/2 are easily generated using the two amplifiers OP1 and OP2.

Moreover, even if the voltage of the reference electrode, which is required to maintain its DC state, is coupled to the data voltages of the data lines to yield the parasitic capacitance CDC between the reference electrode and the data line, the effect of the coupling capacitance between the voltages of the reference electrode and the data voltage is decreased by the feedback of the voltage of the reference electrode to the first amplifier OP1 as described above.

Figure 8:
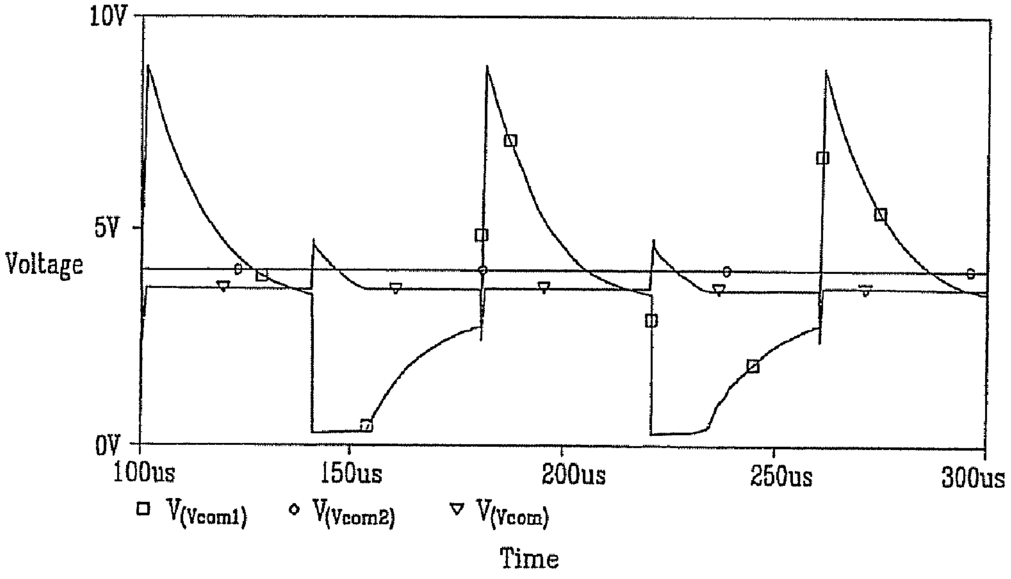
FIGS. 8 and 9 show waveforms of reference voltages Vcom1, Vcom2 and Vcom with respect to a data voltage DATA in the LCD shown in FIG. 7.
Figure 9:
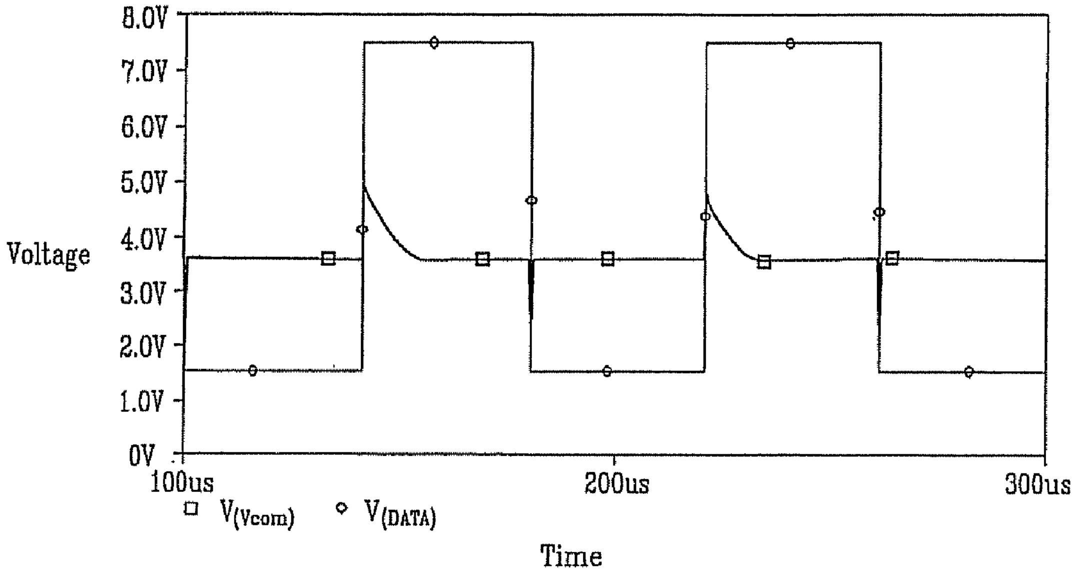

FIG. 8 shows waveforms of the voltages Vcom1, Vcom2 and Vcom in presence of a data voltage, and FIG. 9 shows waveforms of the voltage Vcom and the data voltage.

As shown in FIGS. 8 and 9, the voltage Vcom1 at the application point (x1) of the reference electrode (or the output voltage V'com(x1) of the first amplifier OP1) steeply varies, especially, at near a rising edge or a falling edge of a data voltage $V_{(DATA)}$ due to the coupling capacitance with the data voltage DATA, while the voltage Vcom2 at the application point (x2) (or the output voltage V'com(x5) of the second amplifier OP2) remains constant. Accordingly, the voltage Vcom at the application point (x2) also steeply varies at near the rising or the falling edge of the data voltage $V_{(DATA)}$. The steep variation of the output voltage V'com(x1) is resulted from the feedback of the voltage Vcom of the reference electrode, which is affected by the data voltage $V_{(DATA)}$, and from the relatively small magnitude of the output voltage V'com (x1).

Figure 10:
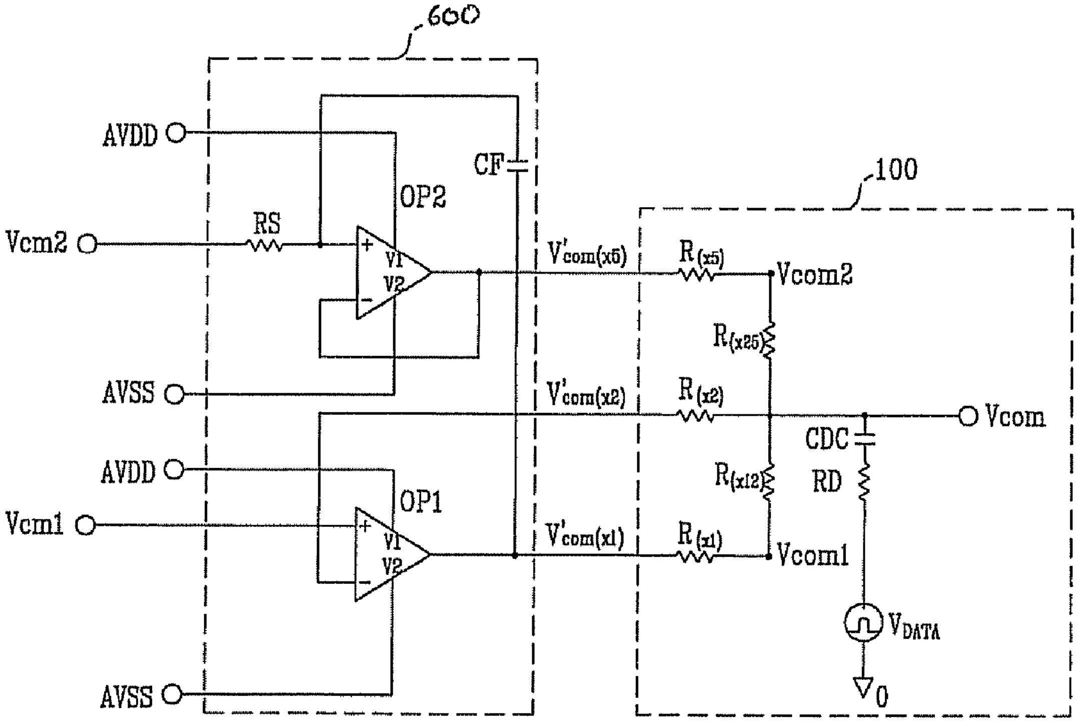
FIG. 10 is a circuit diagram of an exemplary reference voltage generation circuit according to still another embodiment of the present invention.
Figure 11:
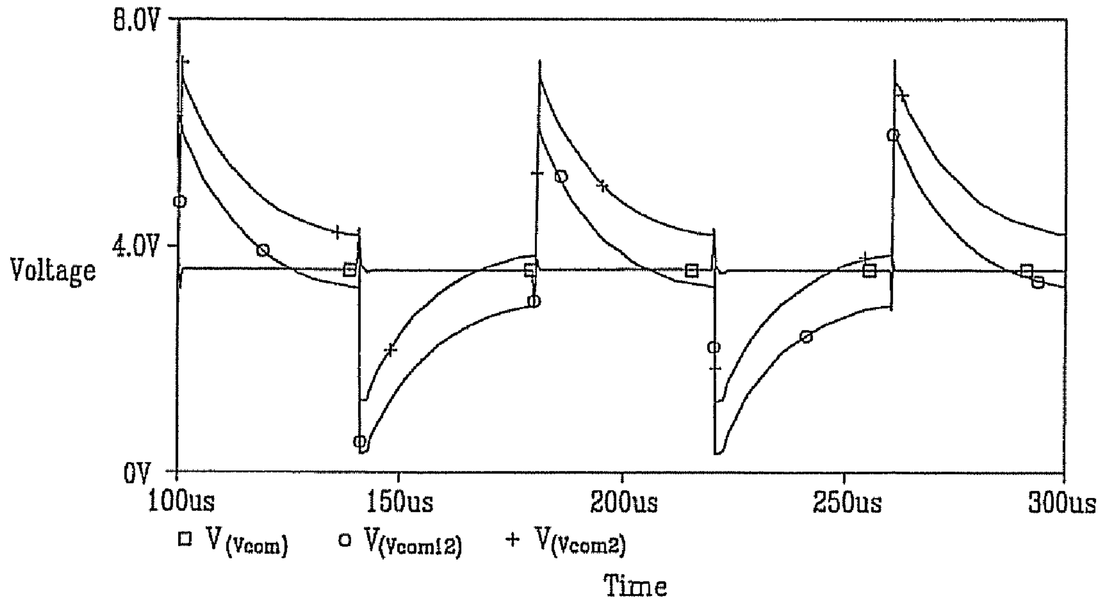
FIGS. 11 and 12 show waveforms of reference voltages Vcom1, Vcom2 and Vcom with respect to a data voltage DATA in the LCD shown in FIG. 10.
Figure 12:
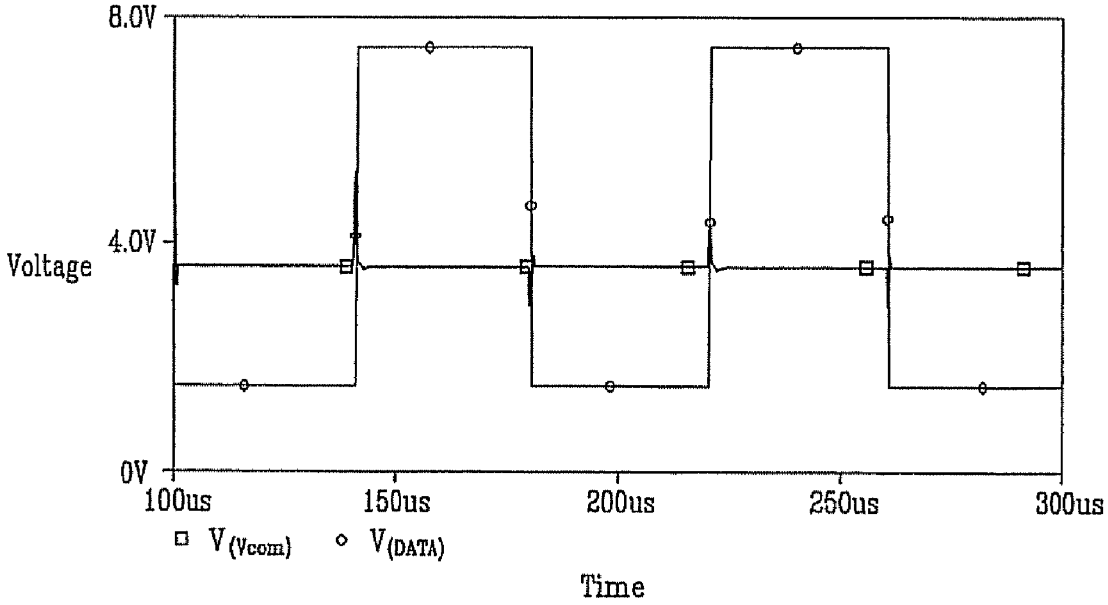

FIG. 10 shows a reference voltage generation circuit according to still another embodiment of the present invention, FIG. 11 shows waveforms of the voltages Vcom1, Vcom2 and Vcom in presence of a data voltage, and FIG. 12 shows waveforms of the voltage Vcom and the data voltage.

As shown in FIG. 10, a configuration of a reference voltage generation circuit 600 according to this embodiment of the present invention is substantially the same as that of the reference voltage generating circuit 500 shown in FIG. 7 except that the output of the first amplifier OP1 is connected to the noninverting input terminal (+) of the second amplifier OP2. For instance, a capacitor CF is connected between the output terminal of the first amplifier OP1 and the noninverting input terminal (+) of the second amplifier OP2, a resistor RS is connected to the noninverting input terminal (+) of the second amplifier OP2 parallel to the capacitor CF.

According to this embodiment, the output of the first amplifier OP1 is coupled with the stable external voltage Vcm2 via the capacitor CF and then provided for the reference electrode. Accordingly, the variation of the output of the first amplifier OA1 may be reduced as shown in FIG. 11.

Furthermore, the output voltage of the first amplifier OP1 as well as the voltage Vcm2 is provided for the noninverting terminal (+) of the second amplifier OP2. Thus, the output voltage of the second amplifier OP2 varies depending on the output voltage of the first amplifier OP1 as shown in FIG. 11. The resembled variations of the output voltages of the first and the second amplifiers OP1 and OP2 make the average voltage Vcom of the reference electrode as shown in FIGS. 11 and 12, since the average voltage Vcom has a value depending on the average value of the two output voltages.

Figure 13:
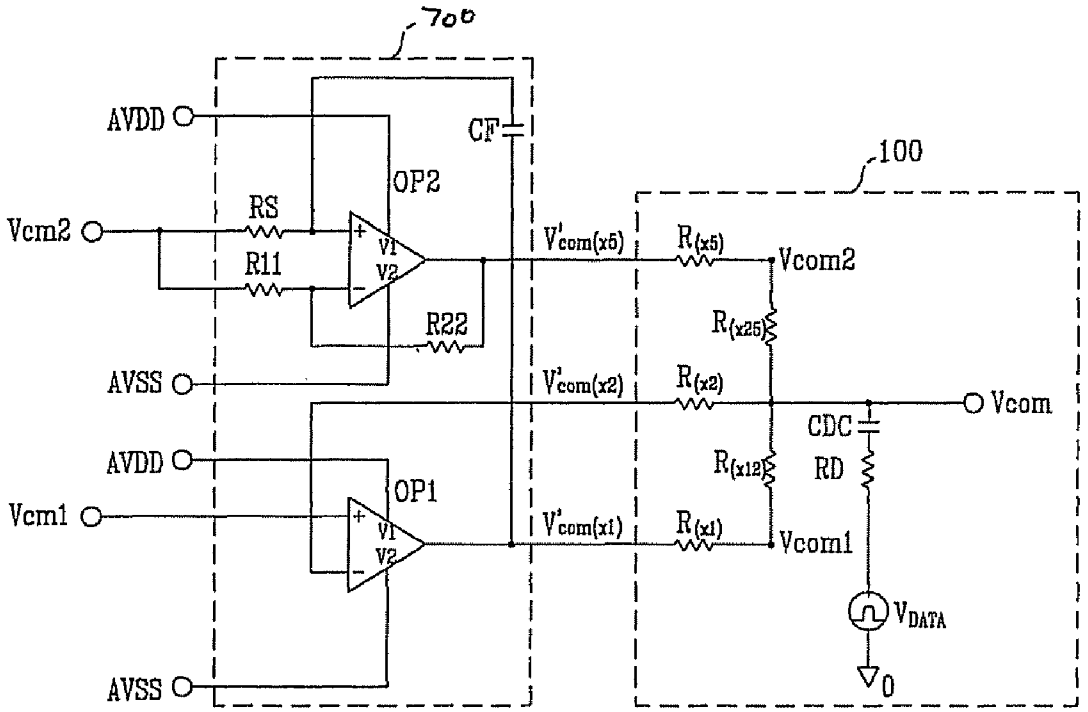
FIG. 13 is a circuit diagram of an exemplary reference voltage generation circuit according to far another embodiment of the present invention.

FIG. 13 shows a reference voltage generation circuit according to further embodiment of the present invention.

As shown in FIG. 13, a configuration of a reference voltage generation circuit 700 according to this embodiment is substantially the same as that of the reference voltage generator 600 shown in FIG. 10 except that the negative feedback of the second amplifier OP2 is made via a feedback resistor R22 and an input resistor R11 is connected between the inverting input terminal (−) of the second amplifier OP2 and the external voltage Vcm2.

The output of the second amplifier OP2 is determined by a ratio of the resistances of the resistors R22 and R11. That is, neglecting the voltage drop across a capacitor CF, $$V'com(x5)=V'com(x1)\times(1+R11/R22).$$

Figure 14:
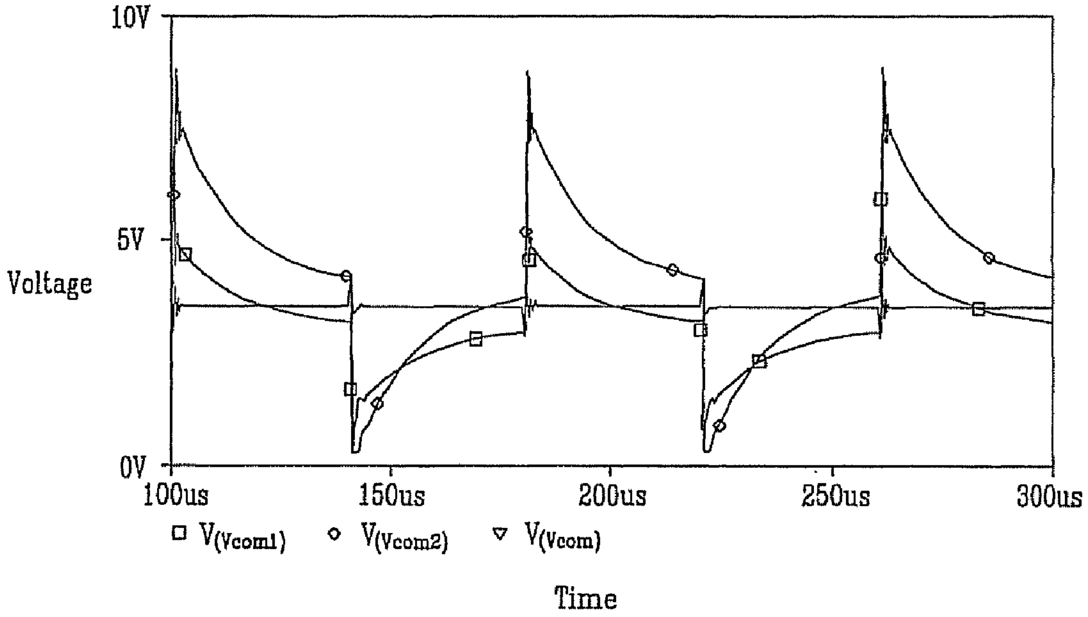
FIG. 14 shows the waveforms of the voltages Vcom1, Vcom2 and Vcom in the LCD shown in FIG. 13.

FIG. 14 shows waveforms of the voltages Vcom1, Vcom2 and Vcom in presence of a data voltage according to this embodiment of the present invention. The curves shown in FIG. 14 are obtained by making R11=R22, and the output voltage of the second amplifier OP2 is twice that of the first amplifier OP1 when neglecting the voltage drop across the capacitor CF. This indicates that the output voltage of the first amplifier OP1 may be controlled by the resistance ratio of the resistors R11 to R22. In particular, an output voltage of the first amplifier OP1 may be compensated with a higher output voltage of the second amplifier OP2 by controlling the resistance ratio of resistors R11 to R22.

According to embodiments of the invention, a reference voltage may be stabilized even if the amplitudes of data voltages are drastically changed.

As described above, the present invention may reduce the flicker by compensating a position-dependency of a kickback voltage. The kickback voltage is compensated by applying a plurality of different reference voltages, each having a different level, to a plurality of points of a reference electrode of the liquid crystal panel assembly. The number of points where the reference voltages are applied may depend on the number of a data driver.

Moreover, according to embodiments of the present invention, the number of the different reference voltages applied to the reference electrode of an LCD as well as the flicker due to the position dependency of the kickback voltage is reduced by the application of two reference voltages of different levels to a first area close to a gate driver and a second area far from the gate driver, and by the application of an average voltage of the two reference voltages to any selected third area located between the two areas.

In addition, according to embodiments of the present invention, since the reference voltage may be stabilized against various amplitudes of data voltages, crosstalk and flicker characteristics are much improved.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims. The use of the terms first, second, etc. do not denote any order or importance, but rather the terms first, second etc. are used to distinguish one element from another and do not designate a quantity of elements.

What is claimed is:

1. A liquid crystal display, comprising:

a liquid crystal panel assembly including a plurality of gate lines, a plurality of data lines intersecting the gate lines, a plurality of switching elements connected to the gate lines and the data lines, a plurality of pixel electrodes connected to the switching elements, and a reference electrode opposing the pixel electrodes;

a gate driver for applying gate signals to the gate lines to activate the switching elements;

a data driver for applying data voltages that are applied to the pixel electrodes to the data lines; and a reference voltage generator for generating more than two reference voltages to be respectively applied to more than two positions of the reference electrode, wherein the reference voltage generator comprises:

a first group of resistors for dividing an external voltage;

a first capacitor for storing an output voltage of the first group of resistors and providing the stored voltage as the second reference voltage; and an amplifier for amplifying the second reference voltage outputted from the first capacitor and outputting an amplified voltage as the first reference voltage.

2. The liquid crystal display of claim 1, wherein the number of reference voltages and positions of the reference electrode for receiving the reference voltages is three.

3. The liquid crystal display of claim 2, wherein the first reference voltage is smaller than the third reference voltage, the third reference voltage is smaller than the second reference voltage, the first position is closer to the gate driver than the third position, and the third position is closer to the gate driver than the second position.

4. The liquid crystal display of claim 3, wherein a value of the third reference voltage is identical to an average value of the first reference voltage and the second reference voltage.

5. The liquid crystal display of claim 3, wherein the reference voltage generator further comprises:

a transistor activated by a first divided voltage outputted from the first group of resistors;

a group of diodes for dropping the output voltage of the transistor; and a second group of resistors for dividing a voltage across the group of diodes, wherein the amplifier includes an inverting terminal connected to the third position of the reference electrode to provide the third reference voltage for the third position.

6. The liquid crystal display of claim 5, wherein the first group of resistors comprises a first resistor, a variable resistor, and a second resistor, the resistors being serially connected to each other.

7. The liquid crystal display of claim 6, wherein the first to third reference voltages are varied by controlling the variable resistor.

8. The liquid crystal display of claim 5, wherein the second group of resistors comprises serially connected third and fourth resistors.

* * * * *